(12) United States Patent
Brune et al.

(10) Patent No.: US 9,880,955 B2
(45) Date of Patent: Jan. 30, 2018

(54) INTERFACE UNIT FOR DIRECT MEMORY ACCESS UTILIZING IDENTIFIERS

(71) Applicant: Robert Bosch GmbH, Stuttgart (DE)

(72) Inventors: Andreas Brune, Backnang (DE); Christopher Pohl, Duesseldorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 14/688,427

(22) Filed: Apr. 16, 2015

(65) Prior Publication Data

US 2015/0301965 A1 Oct. 22, 2015

(30) Foreign Application Priority Data

Apr. 17, 2014 (DE) .................. 10 2014 207 417

(51) Int. Cl.
*G06F 13/28* (2006.01)

(52) U.S. Cl.
CPC .................... *G06F 13/28* (2013.01)

(58) Field of Classification Search
None
See application file for complete search history.

(56) References Cited

U.S. PATENT DOCUMENTS

| 5,765,023 | A | * | 6/1998 | Leger | ..................... | G06F 13/28 |
| | | | | | | 710/22 |
| 5,781,799 | A | * | 7/1998 | Leger | ..................... | G06F 13/28 |
| | | | | | | 710/22 |
| 5,790,530 | A | * | 8/1998 | Moh | ..................... | G06F 13/128 |
| | | | | | | 370/363 |
| 5,875,352 | A | * | 2/1999 | Gentry | .................. | G06F 12/123 |
| | | | | | | 710/22 |
| 6,188,699 | B1 | * | 2/2001 | Lang | ..................... | H04L 29/06 |
| | | | | | | 370/400 |
| 6,418,489 | B1 | * | 7/2002 | Mason | .................... | G06F 13/28 |
| | | | | | | 710/22 |
| 6,754,732 | B1 | * | 6/2004 | Dixon | ..................... | G06F 13/28 |
| | | | | | | 710/22 |
| 7,000,244 | B1 | * | 2/2006 | Adams | ................. | H04N 21/235 |
| | | | | | | 348/E5.005 |
| 7,117,308 | B1 | * | 10/2006 | Mitten | .................. | G06F 13/387 |
| | | | | | | 710/112 |
| 7,370,123 | B2 | * | 5/2008 | Anjo | ..................... | G06F 13/28 |
| | | | | | | 710/20 |

(Continued)

OTHER PUBLICATIONS

'Method for split DMA processing' Disclosed Anonymously, IPCOM000012023D, IP.com Electronic Publication Date: Apr. 2, 2003.*

(Continued)

*Primary Examiner* — Steven Snyder
(74) *Attorney, Agent, or Firm* — Norton Rose Fulbright US LLP; Gerard Messina

(57) ABSTRACT

An interface unit is provided for the arrangement between a bus system, to which a processor unit and a data memory are connectable, and a data transporting unit, in particular a network processor, are described. The interface unit carries out a direct memory access to the data memory as a function of an identifier (chid) previously agreed upon between an application and the data transporting unit.

13 Claims, 5 Drawing Sheets

(56) References Cited

U.S. PATENT DOCUMENTS

| | | | | |
|---|---|---|---|---|
| 7,496,699 B2* | 2/2009 | Pope | G06F 13/28 |
| | | | | 710/22 |
| 7,594,056 B2* | 9/2009 | Fujise | G06F 13/28 |
| | | | | 710/22 |
| 7,694,035 B2* | 4/2010 | Chen | G06F 13/28 |
| | | | | 710/22 |
| 7,886,084 B2* | 2/2011 | Chen | G06F 13/28 |
| | | | | 710/22 |
| 7,937,447 B1* | 5/2011 | Cohen | H04L 67/1097 |
| | | | | 709/212 |
| 8,321,659 B2* | 11/2012 | Haneda | G06F 21/72 |
| | | | | 713/150 |
| 8,615,614 B2* | 12/2013 | Xu | G06F 13/28 |
| | | | | 710/26 |
| 9,251,107 B2* | 2/2016 | Litch | G06F 13/28 |
| 9,652,403 B2* | 5/2017 | Kim | G06F 12/1081 |
| 2002/0064139 A1* | 5/2002 | Bist | H04B 3/23 |
| | | | | 370/289 |
| 2002/0076034 A1* | 6/2002 | Prabhu | H04Q 1/46 |
| | | | | 379/390.02 |
| 2002/0116186 A1* | 8/2002 | Strauss | G10L 25/78 |
| | | | | 704/233 |
| 2002/0161943 A1* | 10/2002 | Kim | G06F 13/28 |
| | | | | 710/22 |
| 2003/0172190 A1* | 9/2003 | Greenblat | H04L 12/422 |
| | | | | 709/251 |
| 2005/0080945 A1* | 4/2005 | Carroll | H04L 49/55 |
| | | | | 710/33 |
| 2006/0053236 A1* | 3/2006 | Sonksen | G06F 13/28 |
| | | | | 710/22 |
| 2006/0080479 A1* | 4/2006 | Anjo | G06F 13/28 |
| | | | | 710/22 |
| 2006/0277545 A1* | 12/2006 | Togawa | G06F 9/3879 |
| | | | | 718/100 |
| 2006/0288129 A1* | 12/2006 | Pope | G06F 13/28 |
| | | | | 710/22 |
| 2008/0209203 A1* | 8/2008 | Haneda | G06F 21/72 |
| | | | | 713/150 |
| 2009/0006662 A1* | 1/2009 | Chen | G06F 13/28 |
| | | | | 710/22 |
| 2009/0006666 A1* | 1/2009 | Chen | G06F 13/28 |
| | | | | 710/23 |
| 2009/0083392 A1* | 3/2009 | Wong | G06F 13/28 |
| | | | | 709/212 |
| 2011/0153877 A1* | 6/2011 | King | G06F 13/28 |
| | | | | 710/26 |
| 2012/0072523 A1* | 3/2012 | Michels | G06F 15/167 |
| | | | | 709/212 |
| 2013/0138841 A1* | 5/2013 | Xu | G06F 13/28 |
| | | | | 710/26 |
| 2015/0006768 A1* | 1/2015 | Litch | G06F 13/28 |
| | | | | 710/26 |
| 2015/0309943 A1* | 10/2015 | Kim | G06F 12/1081 |
| | | | | 710/308 |

OTHER PUBLICATIONS

'Compiler Manipulation of Stream Descriptors for Data Access Optimization' by Abelardo López-Lagunas et al., copyright 2006, IEEE.*

'Method for a content-aware bridge' Disclosed Anonymously, IPCOM000008561D, IP.com Electronic Publication Date: Jun. 24, 2002.*

'Direct Memory Access Controller Capable of Auto-Triggering the Transfer of Multiple Data Blocks' by C.M. Olsen et al., Original Publication Date: Jan. 1, 1998.*

* cited by examiner

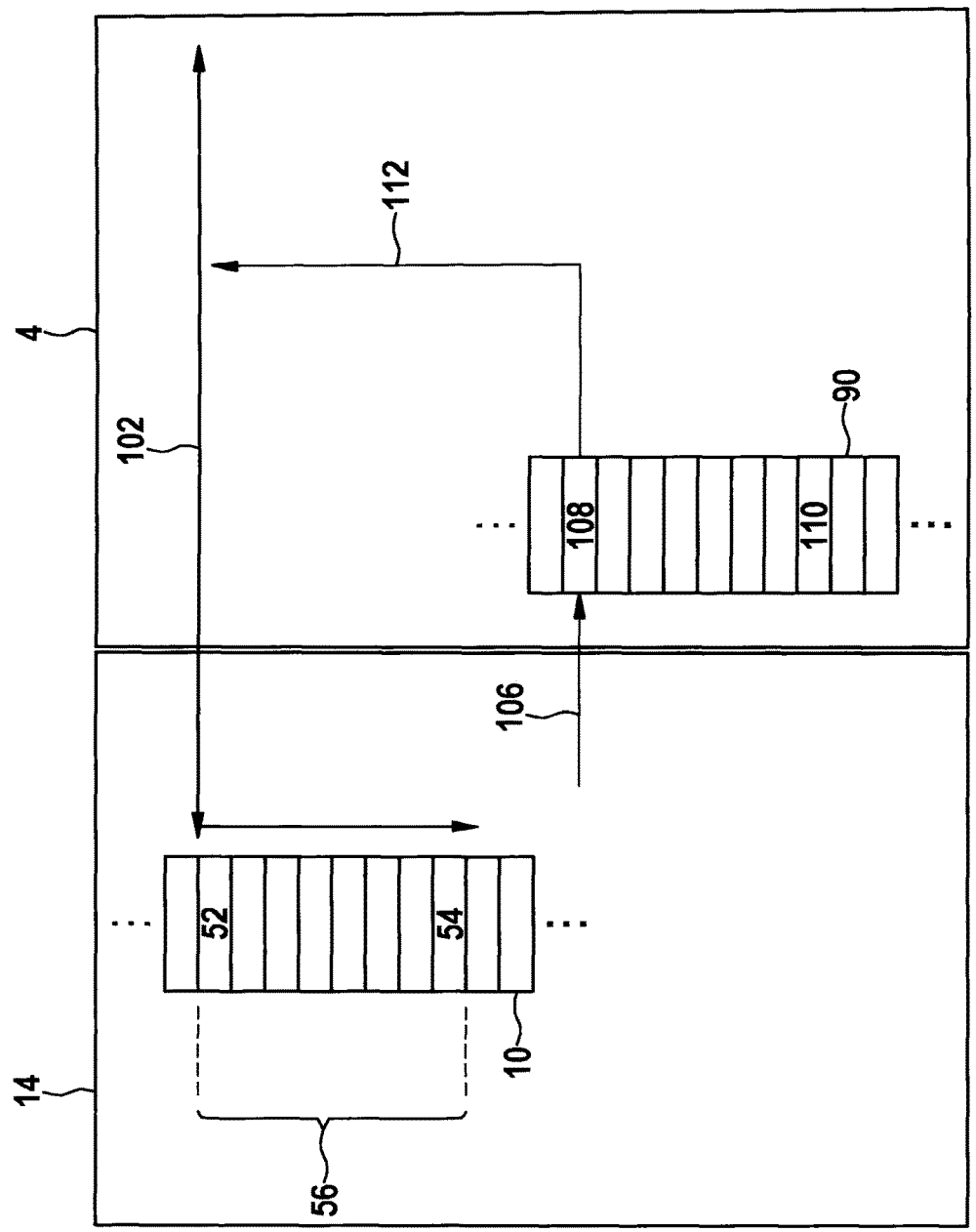

INTERFACE UNIT FOR DIRECT MEMORY ACCESS UTILIZING IDENTIFIERS

FIELD OF THE INVENTION

The present invention relates to an interface unit.

BACKGROUND INFORMATION

Systems which are situated at a bus system and carry out a direct memory access (DMA) using the BUS system are known. It is in particular known that due to a plurality of so-called DMA units at a bus system the access conflicts on the BUS system increase.

In order to monitor the network traffic of different subnetworks or different network types, for example, CAN (controller area network), Flexray and/or Ethernet, multiple interface boards, which must be managed, are required, for example, at a personal computer.

Gateway units between different subnetworks, or also different network types, for example, CAN (controller area network), Flexray and/or Ethernet, must always be adapted to the desired communication between the subnetworks with which the corresponding logic is implemented in software.

SUMMARY

The problem underlying the present invention is solved by an interface unit. Features essential to the present invention are contained in the description which follows and in the drawings; the features may be essential to the present invention both alone and in various combinations, without any explicit reference being made thereto.

By having an interface unit carry out a direct memory access to the data memory as a function of an identifier which an application and the data transporting unit previously agreed upon, it is made possible to provide only one interface unit between a bus system and the data transporting unit, with the aid of which a communication with different subnetworks or network types may be initiated.

Additional features, possible applications, and advantages of the present invention are derived from the following description of exemplary embodiments of the present invention, which are illustrated in the figures of the drawings. All features described or illustrated by themselves or in any desired combination represent the subject matter of the present invention, regardless of their recapitulation in the patent claims or their back-reference, and regardless of their wording or representation in the description or in the figures, respectively. In all figures the same reference numerals are used for elements and variables similar in function, as well as in different specific embodiments. Examples of specific embodiments of the present invention are described below, with reference to the drawings.

BRIEF DESCRIPTION OF THE DRAWINGS

FIG. 5 shows a schematic view of a reception of a data segment.

DETAILED DESCRIPTION

Figure 1:
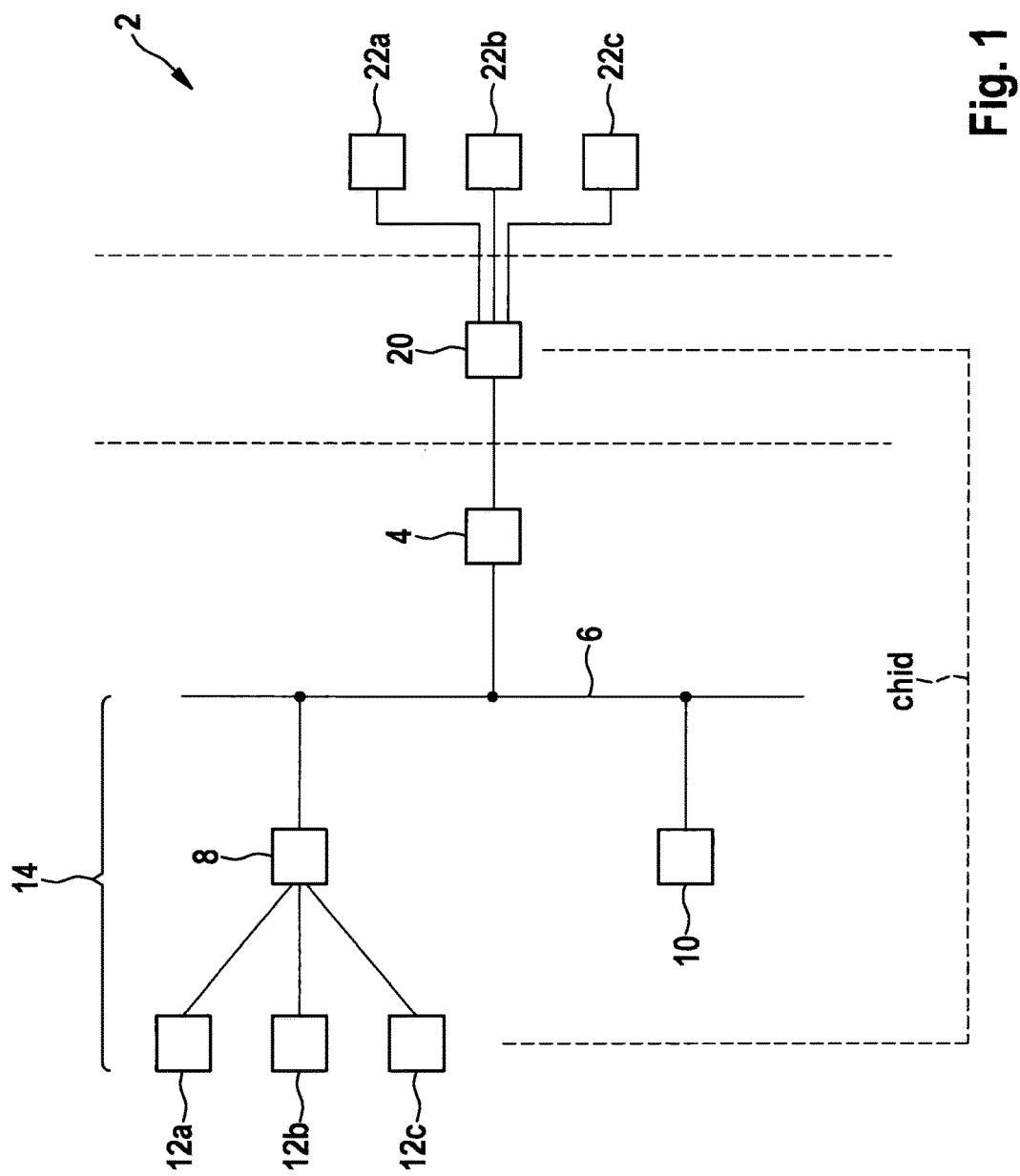
FIG. 1 shows a schematic view of a communication system.

FIG. 1 shows a schematic view of a communication system 2. An interface unit 4 is situated at a bus system 6. Bus system 6 may, for example, be a PCI bus or a proprietary bus of a microcontroller. A processor unit 8 and a data memory 10 are connected to bus system 6. Multiple applications 12a, 12b and 12c are runnable on processor unit 8. Processor unit 8, data memory 10 as well as bus system 6 form a communication unit 14, which may be implemented, for example, as a gateway in the form of a microcontroller or as a personal computer. Communication unit 14 may include interface unit 4 and/or a data transporting unit 20.

Interface unit 4 is connected to data transporting unit 20 and may thus be installed between data transporting unit 20 and bus system 6. Data transporting unit 20 may also be referred to as a network processor. Beside interface unit 4, further communication interfaces 22a, 22b and 22c are connected to data transporting unit 20. Communication interfaces 22 may be assigned to both different network types, for example, CAN, FlexRay or Ethernet and/or to different subnetworks of the aforementioned network types. Of course further network types are conceivable for which a corresponding interface unit 22 may be present. Prior to starting communication system 2, an identifier chid, which is valid for one or multiple data segments, is agreed upon between one of applications 12a through 12c and data transporting unit 20.

Interface unit 4 carries out a direct memory access to data memory 10 via bus system 6 during operation of communication system 2 as a function of the identifier chid previously agreed upon between application 12a, 12b, 12c and data transporting unit 20.

Since interface unit 4 and data transporting unit 20 are preferably implemented in hardware, it may be achieved with the previously agreed upon identifier chid for one or multiple data segments that an arbitration on bus system 6 for a direct memory access by interface unit 4 is greatly simplified for multiple communication interfaces 22, thereby enabling more rapid and more efficient data processing via bus system 6. A plurality of communication interfaces 22 may thereby be advantageously mapped on an interface unit 4 and thus the communication unit 14. The previously agreed upon identifier chid may also be referred to as a channel identifier. In this way, advantages also result for data transporting unit 20, since it may contain deterministic processing steps and may thus be implemented in hardware.

Figure 2:
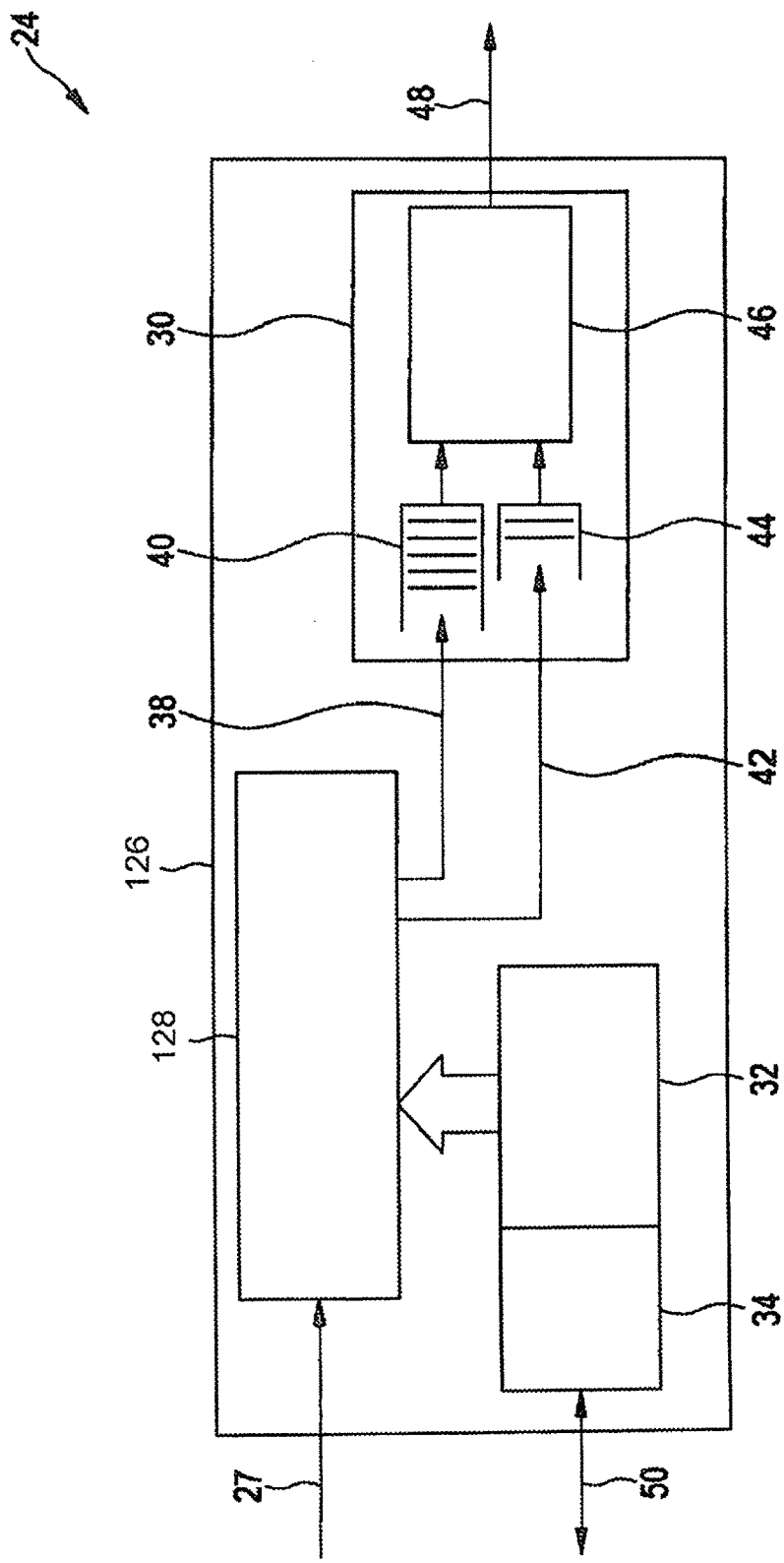
FIG. 2 shows a schematic view of a part of an interface unit.

FIG. 2 shows a schematic view of a detail 24 of interface unit 4. A block 128, an output unit 30 and a block 32 are shown in a block 126. Furthermore, an input descriptor pool 34 is shown. To send a data segment from data memory 10 to data transporting unit 20, the memory area address of the data segment in data memory 10 and the agreed upon identifier chid are ascertained from a descriptor of input descriptor pool 34, and transferred to block 128. Interface unit 4 or block 128 reads out a data segment from data memory 10 according to arrow 27 in the form of a direct memory access via bus system 6 and puts the data segment according to arrow 38 into a queue 40 of output unit 30. A descriptor in the input descriptor pool includes the memory area address of the data segment and the agreed upon identifier as well as further variables. The descriptor is transferred from block 32 to block 128. Accordingly, based on the descriptor, a header is created with the aid of block 128 which matches the data segment, which was read out according to arrow 27, the header being placed into a queue 44 according to arrow 42. Block 46 creates data transporting unit data segments suited for data transporting unit 20 according to an arrow 48. These data transporting unit data segments each include the data segment of queue 40 and the matching header of queue 44. The header may also include a piece of information devid, also referred to as device identification, which identifies the output unit. In this way, the data segment from queue 40 including an associated header, which includes the agreed upon identifier chid, is provided to data transporting unit 20 as the data transporting unit data segment.

According to an arrow 50, input descriptor pool 34 may be read out by processor unit 8 and written upon. For this read and write access to input descriptor pool 34 according to arrow 50, interface unit 4 functions at bus system 6 as the bus slave. For reading direct memory access to data memory 10 according to an arrow 27, interface unit 4 accesses bus system 6 as the bus master. Thus bus system 6 is implemented as a multi-master bus. Of course bus system 6 may also include or support other bus mediation processes and is not limited to a multi-master bus.

FIG. 5 shows, as an example, an interaction between interface unit 4 and communication unit 14 including processor unit 8 and data memory 10.

Figure 3:
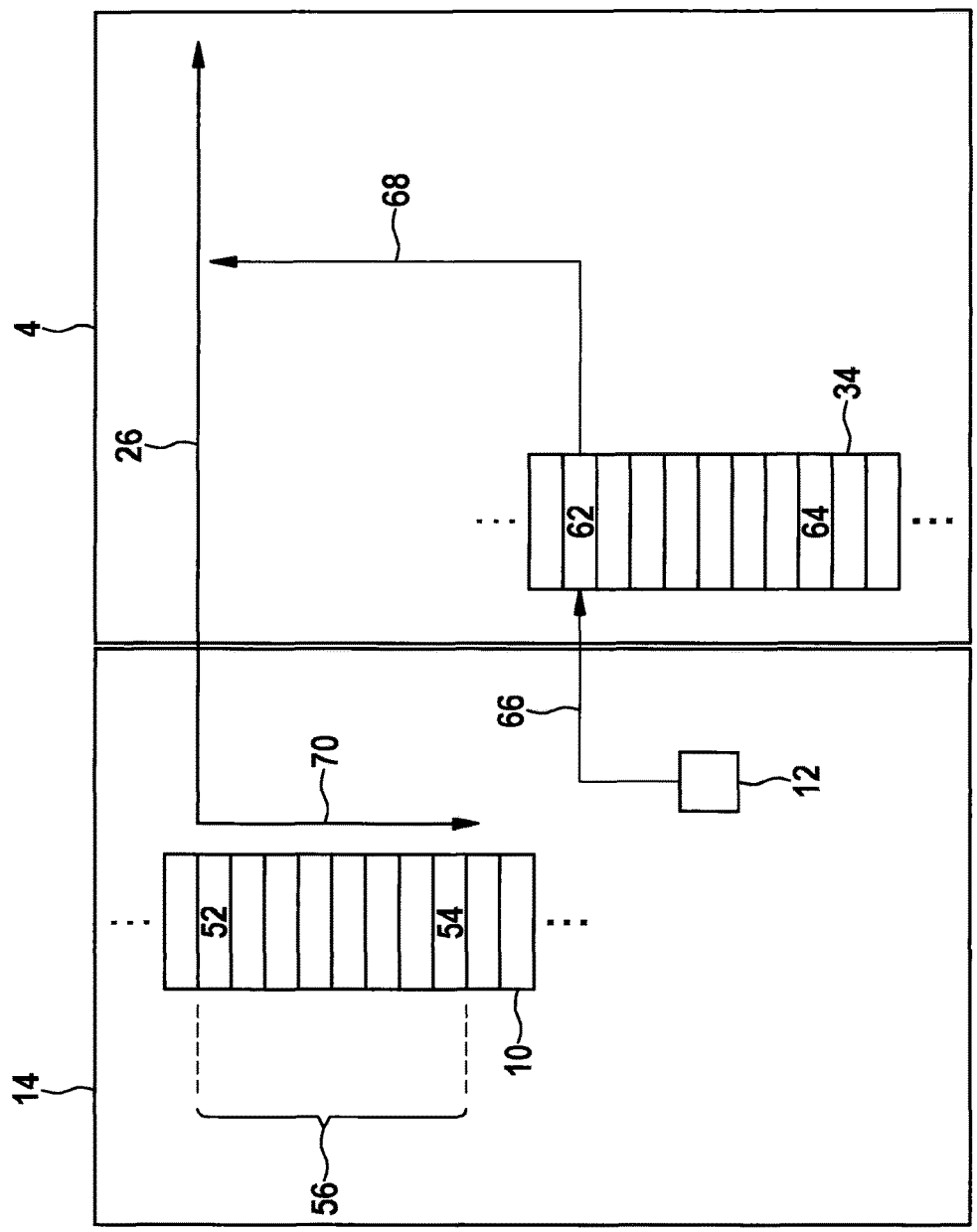
FIG. 3 shows a schematic view of a sending of a data segment.

FIG. 3 shows the sending of a data segment from data memory 10. In a detail of data memory 10, one first data segment 52 and one last data segment 54 of a data block 56 are shown. In the following, a sending of data block 56 having a plurality of data segments is described. Data segments 52 through 54 are a part of data block 56. For each of data segments 52 through 54, a corresponding descriptor 62 through 64 is stored in input descriptor pool 34. Communication unit 14 stores descriptors 62 through 64 for the transmission of the respective data segments 52 through 54 by a corresponding application 12, which is carried out on processor unit 8. For this purpose, communication unit 14 stores a memory area address of data segment 52, 54 in data memory 10 as well as the agreed upon identifier chid. Furthermore, in the descriptor 62 through 64 it is stored which position the respective data segment 52 through 54 has in data block 56. For example, it is stored in descriptor 62 through 64 whether a data segment 52 through 54 is a first data segment such as data segment 52. For example, it is stored in descriptor 62 through 64 whether a data segment 52 through 54 is a last data segment such as data segment 54. Furthermore, the respective size of data segments 52 through 54 is stored in one of descriptors 52 through 54. Furthermore, the memory area address or the memory starting address of data segments 52 through 54 may also be stored. This write access is shown according to arrow 66.

If an application 12, which runs on processor unit 8, intends to send a data block 56, application 12 stores data block 56 in data memory 10. Then, according to arrow 66, the information necessary for data block 56 regarding memory area and agreed upon identifier chid are written into input descriptor pool 34. Furthermore, the sending readiness of the respective data segment 52 through 54 is signaled in the respective descriptor 62 through 64.

If the respective segment 52 through 54 is marked as ready for sending via the associated descriptor 62 through 64, interface unit 4 may carry out a direct memory access according to arrow 68 to data memory 10 according to arrow 26. Accordingly, starting from descriptor 62 up to descriptor 64, the entire data block 56 is read out from data memory 10 according to an arrow 70. Reading out data block 56 takes place by segment or by descriptor, which advantageously enables a parallel filling of data block 56 by application 12, and an emptying of the same data block 56 by interface unit 4. After reading out and transferring a data segment 52, 54 according to arrow 26, the sending readiness is deleted by interface unit 4 in the respective descriptor 62 through 64. The sending readiness may be monitored by communication unit 14 in that the sending readiness of the respective descriptors 62 through 64 is monitored. The processing of the data segments or data blocks present in data memory 10 is simplified by the processing per segment and descriptor pool 34, which enables a hardware design of interface unit 4 and thus a rapid processing for sending data segments 52 through 54.

Figure 4:
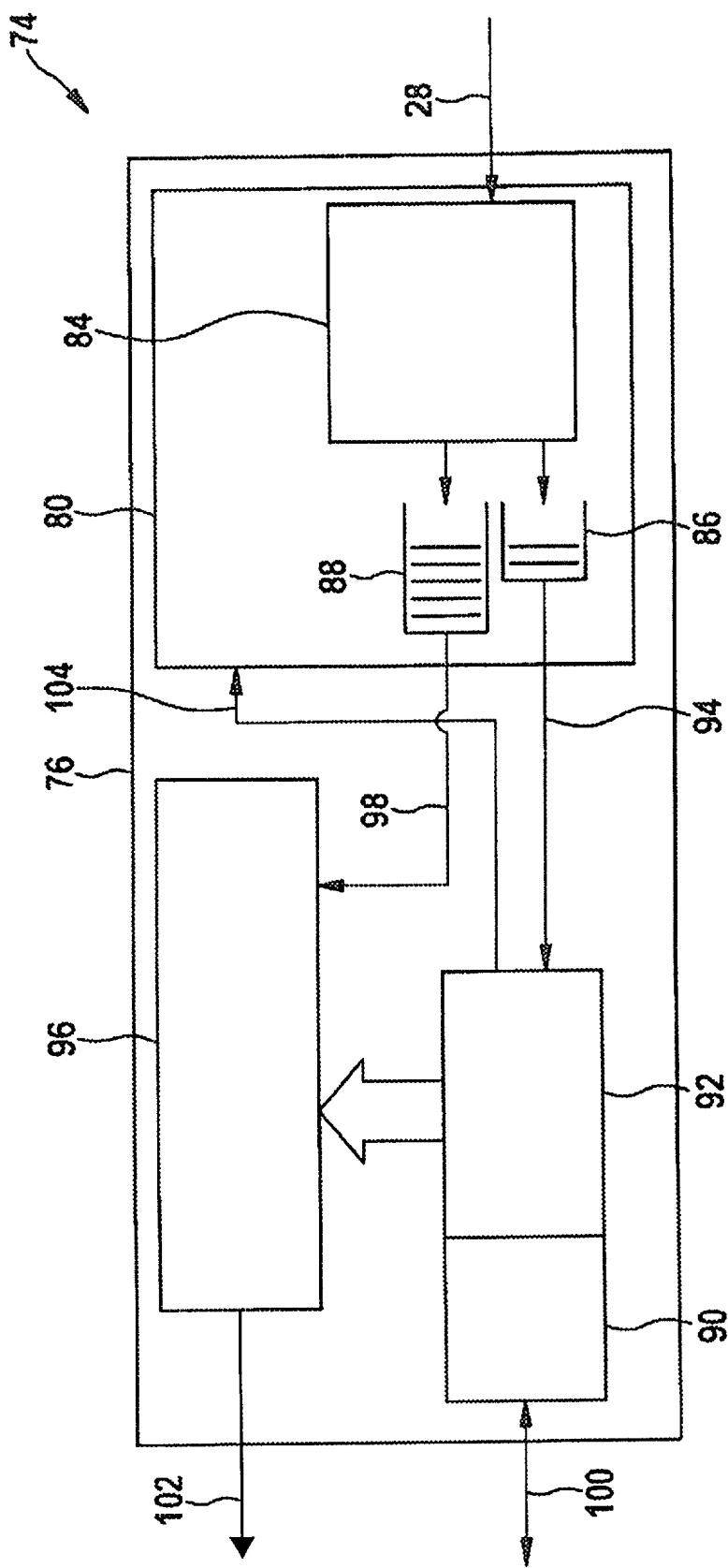
FIG. 4 shows a schematic view of an additional part of the interface unit.

FIG. 4 shows a schematic view of a detail 74 of interface unit 4. In a block 76, data transporting unit data segments are transferred in an input unit 80 from data transporting unit 20 to a block 84 according to arrow 28. The data transporting unit data segments according to arrow 28 contain header information which are placed into a queue 86 of input unit 80 and which contain the agreed upon identifier chid. The data segments within the sense of the present description, i.e., in the form of data, which are to be stored in data memory 10, are placed into a queue 88 by block 84. An output descriptor pool 90 is filled by a block 92 based on the header information from queue 86 according to an arrow 94. During that process, the agreed upon identifier chid is transferred from the received header to descriptor pool 90. Furthermore, based on the header of queue 86, a piece of information, which determines the position of data segments 52, 54 in data block 56, is written into the associated descriptor of descriptor pool 90. According to an arrow 98, a block 96 receives the data segments from queue 88.

A descriptor is filled with a memory area address, which points to an area in data memory 10 to be written on, by a corresponding application 20 or by communication unit 14 according to an arrow 100. With the aid of the descriptor from output descriptor pool 90, block 96 may access data memory 10 according to arrow 102 with the aid of a direct memory access, and write data segment 52, 54 to the memory address provided by the descriptor.

Block 92 maintains output descriptor pool 90 and signals to input unit 80 according to an arrow 104 that free descriptors, which point to free memory areas in data memory 10, are present.

Interface unit 4, or block 76, or block 96 accesses bus system 6 as the bus master for the write access for a data segment 52, 54 according to arrow 102 in the form of a direct memory access to data memory 10. For write and read accesses to output descriptor pool 90, interface unit 4 or block 76 accesses bus system 6 as the bus slave according to arrow 100.

Block 96 assesses in descriptor pool 90 whether a descriptor is present which points to a free memory area in data memory 10. If such a descriptor is present, which points to a free memory area in data memory 10, block 92 signals to data transporting unit 20 according to arrow 104 in block 80 and/or in a form not shown that data memory 10 is ready for reception.

According to arrow 28, a data transporting unit data segment is received by data transporting unit 20. The payload of the data transporting unit data segment is transferred to data memory 10 as data segment 52, 54 via queue 88 and block 96 with the aid of a suitable descriptor. This write access is registered in the corresponding descriptor. Using the descriptor, for which a write access was carried out to data memory 10, the corresponding application 12 may contain the piece of information, which data area or data memory area in memory data 10 was filled, access it and read out data segment 52, 54. In addition, the descriptor contains the corresponding length of data segment 52, 54 as well as the previously agreed upon identifier chid. After application 12 has read out data segment 52, 54 from data memory 10, application 12 may mark data segment 52, 54 in the descriptor as free or delete the corresponding descriptor. As soon as block 96 detects last data segment 54 of a data block 56, a piece of interrupt information is generated. Based on this piece of interrupt information, the corresponding application 12, which is responsible for data segment 52, 54, may be activated. Of course a number of these pieces of interrupt information may also be collected and, once a certain number is reached, an interrupt may be sent to application 12 or to processor unit 8. Descriptor pool 34 as well as descriptor pool 90 may be designed as a circular buffer and may be read and written on by interface unit 4 as well as by processor unit 8.

FIG. 5 shows in schematic, exemplary form the communication for receiving at least one data segment 52, 54 from data transporting unit 20 in data memory 10. Data block 56 includes first data segment 52, last data segment 54, as well as further data segments lying between them.

For receiving data segments, communication unit 14 writes descriptors 108 through 110 into descriptor pool 90 according to an arrow 106, one descriptor respectively including a memory address for the initially still empty memory areas for data segments 52 through 54. Interface unit 4 monitors descriptor pool 90 and signals to unit 80 when free memory areas are present in data memory 10. After signaling free memory areas, the direct memory access according to arrow 112 may be initiated. After writing a data segment 52 through 54, the write access is registered by interface unit 4 in the corresponding descriptor 108 through 110. Accordingly, communication unit 14 may infer from a descriptor 108 through 110 whether the corresponding data segment 52 through 54 was already written into data memory 10.

Input descriptor pool 34 of FIGS. 2 and 3 is preferably written on by one of applications 12 in a descending address sequence, beginning with one last descriptor 64 for a last segment 54 and ending with one first descriptor 62 for a first data segment 52. The interface unit 4 reads out descriptors 62 through 64 in ascending order, beginning from first descriptor 62 up to last descriptor 64.

In the case of incoming data segments, block 92, in contrast, fills output data pool 90 according to arrow 28 from FIG. 4 in an ascending sequence, beginning with a first descriptor 108 and ending with a last descriptor 110.

What is claimed is:

1. An interface unit for arrangement between a bus system and a data transporting unit, a processor unit and a data memory being connectable to the bus system, wherein the interface unit carries out a direct memory access to the data memory as a function of an identifier previously agreed upon between an application running on the processor unit and the data transporting unit, the interface unit comprising:
an arrangement for sending a data segment from the data memory to the data transporting unit; and
an arrangement for ascertaining, from a descriptor of an input descriptor pool, a memory area address of the data segment in the data memory and the agreed upon identifier, wherein:
the interface unit reads the data segment from the data memory with the aid of the direct memory access,
the data segment, including an associated header, is provided to the data transporting unit, and
the header includes the agreed upon identifier,
wherein:
the data segment is part of a data block, and
the descriptor of the input descriptor pool contains a first piece of information which determines a position of the data segment in the data block, and contains a second piece of information which indicates a sending of the data segment.

2. The interface unit as recited in claim 1, further comprising:
in order to receive at least one of the data segment and the data block from the data transporting unit in the data memory, an arrangement for writing into a descriptor of an output descriptor pool the agreed upon identifier and a third piece of information which determines the position of the data segment in the data block.

3. The interface unit as recited in claim 2, further comprising:
an arrangement for writing the data segment into the data memory with the aid of a direct memory access; and
an arrangement for storing, after writing the data segment, a piece of information in the associated descriptor that indicates a write access carried out to the data memory.

4. The interface unit as recited in claim 2, further comprising:
an arrangement for accessing the bus system as a bus master for the direct memory access to the data memory; and
an arrangement for accessing the bus system as a bus slave for writing and reading accesses to at least one of the input descriptor pool and the output descriptor pool.

5. A communication unit, comprising:
a data transporting unit;
an interface unit for arrangement between a bus system and the data transporting unit, a processor unit and a data memory being connectable to the bus system, wherein the interface unit carries out a direct memory access to the data memory as a function of an identifier previously agreed upon between an application running on the processor unit and the data transporting unit, the interface unit including:
an arrangement for sending a data segment from the data memory to the data transporting unit; and
an arrangement for ascertaining, from a descriptor of an input descriptor pool, a memory area address of the data segment in the data memory and the agreed upon identifier, wherein:
the interface unit reads the data segment from the data memory with the aid of the direct memory access,
the data segment, including an associated header, is provided to the data transporting unit, and
the header includes the agreed upon identifier,
wherein:
the data segment is part of a data block, and
the descriptor of the input descriptor pool contains a first piece of information which determines a position of the data segment in the data block, and contains a second piece of information which indicates a sending of the data segment; and
further communication interfaces connected to the data transporting unit and assigned to at least one of different network types and different subnetworks.

6. A method for operating an interface unit arranged between a bus system and a data transporting unit, a processor unit and a data memory being connectable to the bus system, wherein the interface unit carries out a direct memory access to the data memory as a function of an identifier previously agreed upon between an application running on the processor unit and the data transporting unit, wherein the interface unit has an input descriptor pool, wherein for sending a data segment from the data memory to the data transporting unit, a memory area address of the data segment in the data memory and the agreed upon identifier are written into a descriptor of the input descriptor pool by the application, and wherein the data segment is part of a data block, and the descriptor contains a first piece of information which determines a position of the data segment in the data block, and contains a second piece of information which indicates a sending of the data segment.

7. The method as recited in claim 6, wherein the application accesses the bus system as a bus master via the processor unit for at least one of a read access and a write access to the input descriptor pool.

8. A non-transitory computer program product, for an interface unit, wherein the computer program product is designed to carry out a method for operating an interface unit arranged between a bus system and a data transporting unit, a processor unit and a data memory being connectable to the bus system, wherein the interface unit carries out a direct memory access to data memory as a function of an identifier previously agreed upon between an application running on the processor unit and the data transporting unit, wherein the interface unit has an input descriptor pool, and wherein for sending a data segment from the data memory to the data transporting unit, a memory area address of the data segment in the data memory and the agreed upon identifier are written into a descriptor of the input descriptor pool by the application, and wherein the data segment is part of a data block, and the descriptor contains a first piece of information which determines a position of the data segment in the data block, and contains a second piece of information which indicates a sending of the data segment.

9. A non-transitory memory unit on which a computer program product is stored, the computer program product being for an interface unit, wherein the computer program product is designed to carry out a method for operating an interface unit arranged between a bus system and a data transporting unit, a processor unit and a data memory being connectable to the bus system, wherein the interface unit carries out a direct memory access to data memory as a function of an identifier previously agreed upon between an application running on the processor unit and the data transporting unit, wherein the interface unit has an input descriptor pool, and wherein for sending a data segment from the data memory to the data transporting unit, a memory area address of the data segment in the data memory and the agreed upon identifier are written into a descriptor of the input descriptor pool by the application, and wherein the data segment is part of a data block, and the descriptor contains a first piece of information which determines a position of the data segment in the data block, and contains a second piece of information which indicates a sending of the data segment.

10. The interface unit as recited in claim 1, wherein the data transporting unit includes a network processor.

11. The communication unit as recited in claim 5, wherein the communication unit includes one of a gateway unit and a personal computer.

12. The communication unit as recited in claim 5, wherein the different network types includes at least two of CAN, FlexRay, and Ethernet.

13. The non-transitory computer program product as recited in claim 8, wherein the computer program product is a driver.

* * * * *